United States Patent Office 3,164,476
Patented Jan. 5, 1965

3,164,476
EMULSIFIER FOR CAKE BATTERS
Gaston Dalby, New York, N.Y., and Harry C. Fisher, Rocky River, Ohio, assignors to The H. C. Fisher Company, Cleveland, Ohio, a corporation of Ohio
No Drawing. Filed July 3, 1962, Ser. No. 207,394
5 Claims. (Cl. 99—92)

Our present invention relates to an emulsifier for the fat ingredients of cake batters.

Cakes contain as an ingredient a fat which may be added as a shortening ingredient or may be present in the yolk of eggs forming a part of the batter.

The invention relates to an emulsifier for the fat constituent from any source to make an emulsion of the fat constituent in water, this emulsion being of the type known as an oil-in-water emulsion, although the fats themselves are generally solid at ordinary temperatures.

A fat commonly added as a shortening to the cake batter is a glyceride of fat-forming fatty acids, although it may be any glyceride of a fatty acid having a long carbon chain, for example, 16 to 18 carbon atoms.

The purpose of the emulsifier is to bring the fats into intimate contact with the flour and other ingredients of the batter. This is desirable in the making of a cake batter. The emulsifier influences the texture of the cake. Desirable influences are that the emulsion of the fat in water must be a stable one, that is, one in which the fat will not separate from the water on standing. It must be one which will not make the cake crumb too tender. It should be one that imparts good whipping qualities so that the batter may be whipped adequately in a short period of time, thereby avoiding breakdown of the eggs, which would impair the quality of the cake.

Certain emulsifiers may have the qualities which are good in one respect and which are undesirable in other respects.

Our present invention provides an emulsifier for cake batters in which various ingredients are combined in such a manner that any undesirable characteristics of one ingredient are counteracted by the other ingredients, to provide an emulsifier, that fulfills adequately the requirements of a cake batter.

Our emulsifier comprises the ingredients given below in the relative proportions or ratios of the various ingredients, namely as follows:

| Ingredient | Unit | Amount |
|---|---|---|
| Glyceryl monostearate | lbs | 9–13 |
| Glycerine | lbs | 1½–3½ |
| Propylene glycol | lbs | 6–10 |
| Sorbitan polyoxyethylene monostearate | lbs | 11–15 |
| Sorbitan monostearate | lbs | 7–10 |
| Sodium propionate | oz | 4–15 |
| Water | lbs | 65–75 |

A preferred example of the composition of our emulsifier:

| Ingredient | Amount |
|---|---|
| Glyceryl monostearate | 11 lbs. |
| Glycerine | 2 lbs.–8 oz. |
| Propylene glycol | 8 lbs. |
| Sorbitan polyoxyethylene monostearate | 13 lbs. |
| Sorbitan monostearate | 9 lbs. |
| Sodium propionate | 13 oz. |
| Water | 75 lbs. |

The properties of these various ingredients and their cooperative relationship are as follows:

Glyceryl monostearate, using the distilled grade, as a lipophilic type of emulsifier which will tend to form a water-in-oil emulsion. Being only slightly hydrophilic, it is a very sluggish emulsifier when used alone. The desirable type of cake emulsion is the oil-in-water type; the opposite of that normally produced by pure glyceryl monostearate. In combination with other emulsifiers, glyceryl monostearate may be made to act to form oil-in-water types; and under such conditions forms a stable type of emulsion. It does not have outstanding whipping properties. Glyceryl monostearate does have valuable anti-staling properties in the finished cake. It helps retain softness and at the same time adds stability to the cell wall of the cake. This last characteristic may be due to its high melting point (140° F.).

The undesirable characteristics of glyceryl monostearate are that it tends to form water-in-oil emulsions instead of an oil-in-water type of emulsion, and that it has a sluggish or slow action during whipping of the cake batter.

The desirable characteristics are that it forms stable emulsions, anti-staling in the finished cake, and may add stability to the cell wall of the cake crumb.

Sorbitan monostearate, like pure glyceryl monostearate, is a lipophilic type of emulsifier and tends to form water-in-oil emulsions. It has one outstanding quality and that is its whipping characteristics. This quality is important in commercial cake manufacturing.

Polyoxyethylene sorbitan monostearate-(20): The figure (20) indicates that there are 20 ethylene oxide units in the polyoxyethylene polymer. Polyoxyethylene sorbitan monostearate is a powerful hydrophilic emulsifier and forms oil-in-water types of emulsions. This type is desirable in cake batters. It is so powerful a hydrophilic type that, in the proportions of our formula, it overcomes the anti-hydrophilic action of glyceryl monostearate and sorbitan monostearate. In addition to this powerful hydrophilic action, this emulsifier has excellent anti-staling properties.

Propylene glycol: This material is miscible in water and tends to dissolve many types of oils or oil-soluble types of materials. It is slightly more lipophilic than glycerine or glycerol. Because of its solubility characteristics, it aids in bringing glyceryl monostearate, sorbitan monostearate, and polyoxyethylene sorbitan monostearate into surface activity. It thus helps counter the sluggish action of glyceryl monostearate. In a cake batter, it helps bring the fat into contact with the emulsifier.

Glycerine or glycerol (glycerine is the common name, glycerol the chemical name): Glycerine is more hydrophilic than propylene glycol, but acts in the same general manner. The combination of the two products produces ideal functional characteristics.

The sodium propionate in the emulsifier formula is present as a mold-inhibiting agent to promote or extend shelf-life of the emulsifier when used in the quantities we have suggested.

Inasmuch as the emulsifier is usable for cake batters of various recipes and as these recipes form no part of our invention, examples of the use are not necessary and are, therefore, not included.

In making the emulsifier the various ingredients are assembled and mixed slightly, then the mixture is heated to a temperature above the melting point of the stearate; the stearate normally melting at 140° F., then stirring the mixture to a fine emulsion and cooling while stirring to a temperature below the melting point of the stearate, that is, to a temperature below 140° F. A resulting composition is a thick liquid or semi-liquid mass of about the consistency of mayonnaise.

What we claim is:

1. An emulsifier for cake batters which comprises the following:

| | | |
|---|---|---|
| Glyceryl monostearate | lbs | 9–13 |
| Glycerine | lbs | 1½–3½ |
| Sorbitan polyoxyethylene monostearate | lbs | 11–15 |
| Sorbitan monostearate | lbs | 7–10 |
| Water | lbs | 65–75 |
| Sodium propionate | oz | 6–15 |

2. An emulsion for cake batters which comprises the following:

| | |
|---|---|
| Glyceryl monostearate | 11 lbs. |
| Glycerine | 2 lbs.–8 oz. |
| Propylene glycol | 8 lbs. |
| Sorbitan polyoxyethylene monostearate | 13 lbs. |
| Sorbitan monostearate | 9 lbs. |
| Sodium propionate | 7 oz. |
| Water | 65 lbs. |

3. An emulsion for cake batters which comprises the following:

| | |
|---|---|
| Glyceryl monostearate | 11 lbs. |
| Glycerine | 2 lbs.–8 oz. |
| Propylene glycol | 8 lbs. |
| Sorbitan polyoxyethylene monostearate | 13 lbs. |
| Sorbitan monostearate | 9 lbs. |
| Sodium propionate | 13 oz. |
| Water | 75 lbs. |

4. A method of forming an emulsifier for cake batters which comprises mixing:

| | | |
|---|---|---|
| Glyceryl monostearate | lbs | 9–13 |
| Glycerine | lbs | 1½–3½ |
| Propylene glycol | lbs | 6–10 |
| Sorbitan polyoxyethylene monostearate | lbs | 11–15 |
| Sorbitan monostearate | lbs | 7–10 |
| Sodium propionate | oz | 6–13 |
| Water | lbs | 65–75 |

Heating the mixture to a temperature above the melting point of the glyceryl monostearate; and then cooling under agitation to a temperature below the melting point of the glyceryl monostearate.

5. A method of forming an emulsifier for cake batters which comprises mixing:

| | | |
|---|---|---|
| Glyceryl monostearate | lbs | 9–13 |
| Glycerine | lbs | 1½–3½ |
| Propylene glycol | lbs | 6–10 |
| Sorbitan polyoxyethylene monostearate | lbs | 11–15 |
| Sorbitan monostearate | lbs | 7–10 |
| Sodium propionate | oz | 6–13 |
| Water | lbs | 65–75 |

Heating the mixture to a temperature above the melting point of 140° F., and cooling below a temperature of 140° F., while under agitation.

References Cited by the Examiner

UNITED STATES PATENTS

| 2,557,524 | 6/51 | Wade | 99—92 X |
| 2,768,082 | 10/56 | Crossland et al. | 99—92 |
| 2,932,574 | 4/60 | Bour | 99—92 X |

FOREIGN PATENTS 18,913 1889 Great Britain.

A. LOUIS MONACELL, *Primary Examiner.*

BEATRICE H. STRIZAK, *Examiner.*